(No Model.)
J. M. LONG.
HORSE RAKE.
No. 312,645. Patented Feb. 24, 1885.
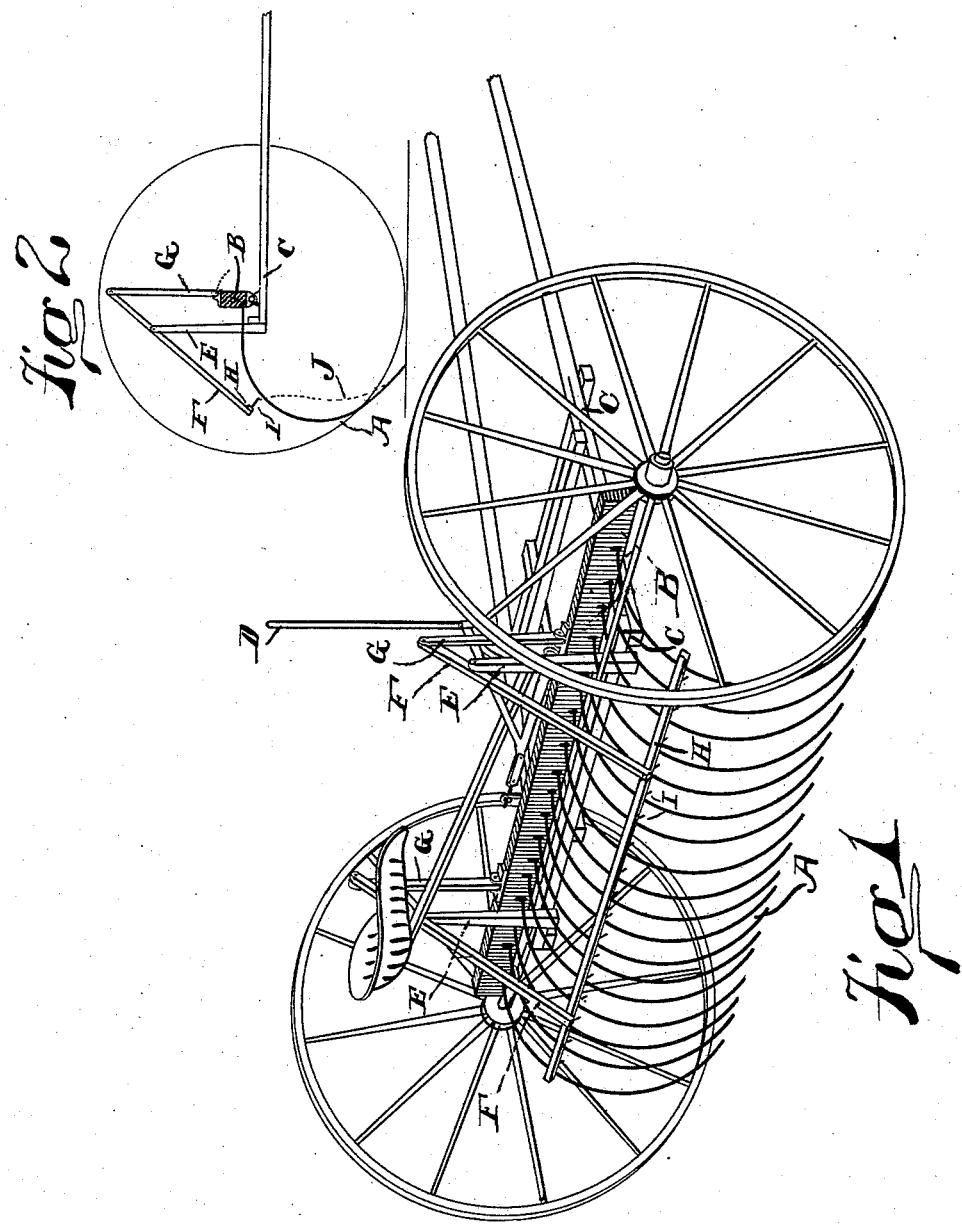
Witnesses:
W. A. Seward.
C. H. Bundy
John M. Long, Inventor
by James W. See, Attorney

UNITED STATES PATENT OFFICE.

JOHN M. LONG, OF HAMILTON, OHIO.

HORSE-RAKE.

SPECIFICATION forming part of Letters Patent No. 312,645, dated February 24, 1885.

Application filed January 25, 1884. (No model.)

*To all whom it may concern:*

Be it known that I, JOHN M. LONG, of Hamilton, Butler county, Ohio, have invented certain new and useful Improvements in Horse-Rakes, of which the following is a specification.

This invention relates to mechanism for aiding the discharge from, or, in other words, cleaning, the curved-spring teeth of horse hay-rakes.

The invention will be fully understood from the following description, taken in connection with the accompanying drawings, in which—

Figure 1 represents in perspective a horse hay-rake embodying my improvement, and Fig. 2 a vertical transverse section elementary in character, illustrating the cleaning movement.

In the drawings, A represents the usual rank of curved elastic rake-teeth; B, a rock-bar to which the upper ends of the teeth are secured, as usual; C, the general frame-work of the machine, being parts which do not partake of any of the motions incident to the dumping operation; D, a lever for rocking the bar B in the usual manner and through the usual means; E, a pair of standards secured to the frame-work of the machine, standing a slight distance to the rear of the bar B and projecting well above it; F, a pair of levers pivoted to the upper ends of said standards; G, links or connecting-rods connecting the front ends of the levers F with pivots secured to the bar B; H, a clearer-bar secured to the rear ends of the levers F, and located over the swell of the rake-teeth, outside of the rake-teeth; I, short studs or teeth projecting from the under side of the clearer-bar H, in a position and direction to enter between the rake-teeth; J, a dotted line in Fig. 2, indicating the path with relation to the curve of the rake-teeth, through which the ends of the studs I move when the rake is dumped.

The means for effecting the rocking of the tooth-holding bar form no part of my invention, it being enough to say that the invention is applicable to rakes of that class in which the dumping is effected by a partial rotation of the bar to which the teeth are attached.

In the example shown in the drawings, the bar B rocks upon an axis coinciding with the axis of the wheels, and the pivots at the lower ends of the links G are located somewhat above the axis of rotation of the bar. The consequence is that as the bar is rocked to lift the teeth the pivots at the foot of the links will move forward and descend, thus drawing downward the forward ends of the levers F and causing the clearer-bar H to rise at the same time the teeth rise in the act of dumping; but the parts are so proportioned that the rising velocities of the rake-teeth and of the clearer-bar H are not equal at all times.

When the rake-teeth are in raking position, the studs I do not project between the teeth, and hence do not interfere at all with the free rise of hay within the teeth.

The act of rocking the bar B raises the teeth, and simultaneously the clearer-bar H with a slower movement, which causes the studs I to enter between the rake-teeth and then to traverse toward the points of the rake-teeth, and then to retreat from between the teeth. In this manner the studs serve to clean the teeth without at all interfering with the interior of the teeth during the non-dumping period.

The dotted line J in Fig. 2 indicates about the direction, relative to the curve of the rake-teeth, traveled by the ends of the studs I during the dumping action.

I claim as my invention—

In a hay-rake, the combination of a frame-work, a rocking rake-head pivoted thereto, a series of curved teeth secured to the rake-head, a pair of standards or pivot-supports sustained by said frame-work, a pair of arms pivoted to said standards or pivot-supports, a clearer-bar attached to said arms and provided with studs or teeth, and links connecting said arms with said rake-head, substantially as and for the purpose specified.

JOHN M. LONG.

Witnesses:
J. W. SEE,
W. A. SEWARD.